(12) United States Patent
Okada (10) Patent No.: US 7,424,059 B2
(45) Date of Patent: Sep. 9, 2008

(54) DATA TRANSFER CIRCUIT

(75) Inventor: Atsuhiko Okada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 795 days.

(21) Appl. No.: 10/999,957

(22) Filed: Dec. 1, 2004

(65) Prior Publication Data

US 2005/0220196 A1  Oct. 6, 2005

(30) Foreign Application Priority Data

Apr. 1, 2004  (JP) .............. 2004-109062

(51) Int. Cl.
*H04B 3/00* (2006.01)
*H04L 25/00* (2006.01)

(52) U.S. Cl. .............. 375/257; 375/356; 375/360; 375/372

(58) Field of Classification Search .............. 375/257, 375/356, 360, 372; 327/91
See application file for complete search history.

(56) References Cited

U.S. PATENT DOCUMENTS 6,308,077 B1 * 10/2001 Walsh .............. 455/503
6,728,126 B1 * 4/2004 Issaq et al. .............. 365/96
7,170,316 B2 * 1/2007 Dhong et al. .............. 326/40
2004/0184572 A1 * 9/2004 Kost et al. .............. 375/354

FOREIGN PATENT DOCUMENTS

JP  2002-215568  8/2002

* cited by examiner

*Primary Examiner*—Ted Wang
(74) *Attorney, Agent, or Firm*—Studebaker & Brackett PC; Donald R. Studebaker (57) ABSTRACT

A transmission unit loads transmission data on a first register and outputs it to a transfer line and starts counting the transmission clock signals in a strobe generation counter according to a transmission clock signal. When the counted value reaches a set value, a strobe signal is output. A reception unit loads the transfer data onto a second register according to a reception clock signal. An edge detection unit generates a valid signal with a pulse width corresponding to one cycle of the reception clock signal when the strobe signal is detected. A third register loads the data that is output from the second register, and outputs it as reception data according to the reception clock signal when the valid signal is supplied.

17 Claims, 8 Drawing Sheets

FIG. 8

DATA TRANSFER CIRCUIT

BACKGROUND OF THE INVENTION

1. Field of the Invention

The present invention relates to a data transfer circuit for transferring data between circuits that use clock signals having different cycles with respect to each other.

2. Description of the Related Art

Figure 2A:
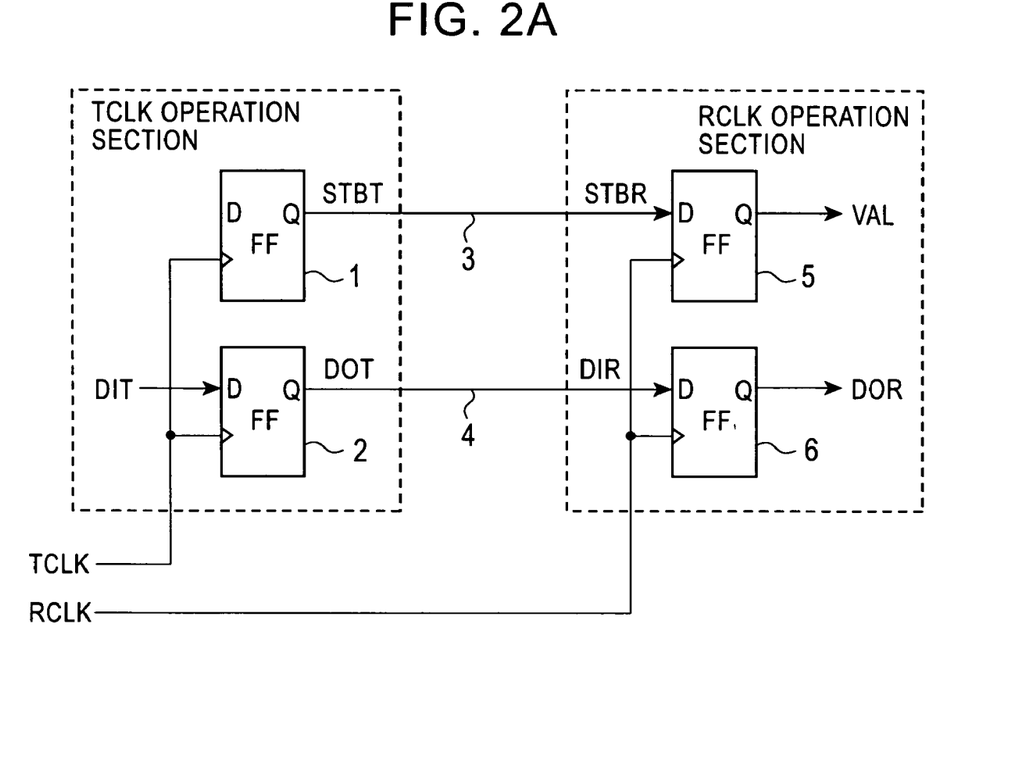
FIG. 2A is a block diagram showing a conventional asynchronous data transfer circuit.
Figure 2B:
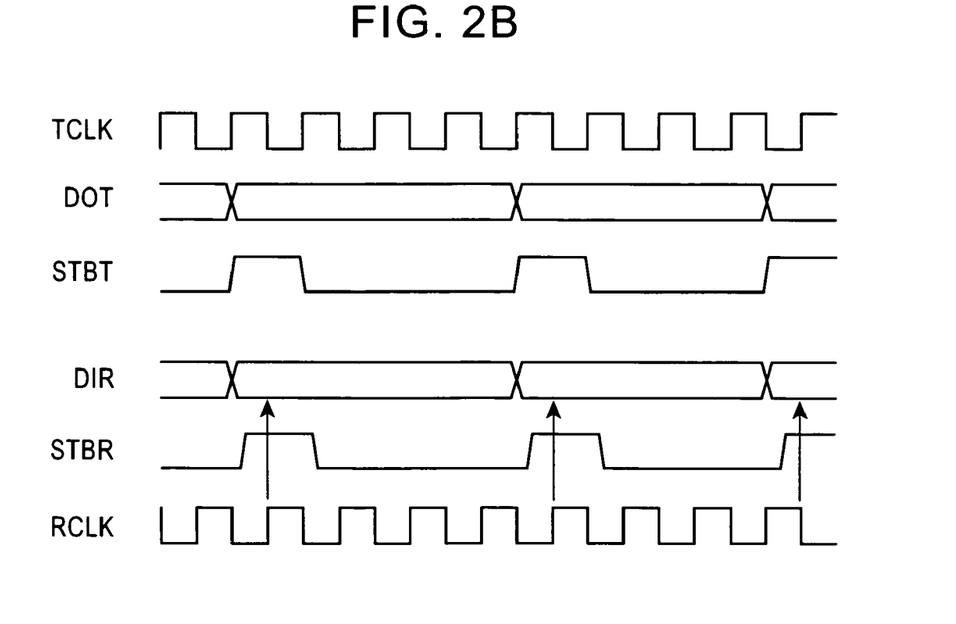
FIG. 2B is a signal waveform chart illustrating an operation of the data transfer circuit shown in FIG. 2A.

FIGS. 2A and 2B of the accompanying drawings depict a conventional asynchronous data transfer method disclosed in Japanese Patent Kokai No. 2002-215568. FIG. 2A is a block diagram of an asynchronous interface circuit showing a TCLK (transmission side operation clock) operation section and a RCLK (reception side operation clock) operation section provided in an LSI. FIG. 2B is a signal waveform chart depicting an operation of the circuit shown in FIG. 2A.

As shown in FIG. 2A, the TCLK operation section includes a flip-flop (hereafter called 'FF') 1 for outputting a transfer reference signal STBT at a timing of a transmission side operation clock TCLK, and an FF 2 for loading transmission data DIT to be transmitted and for outputting it as transfer data DOT at the timing of the transmission side operation clock TCLK. The transfer reference signal STBT and the transfer data DOT are transferred to the RCLK operation section via transfer lines 3 and 4. The transfer lines 3 and 4 are laid out such that a delay of the transfer data DOT is more significant than that of the transfer reference signal STBT.

The RCLK operation section includes an FF 5 for loading a transfer reference signal STBR transferred via the transfer line 3 and for outputting it as a valid signal VAL at a timing of a reception side operation clock RCLK, and an FF 6 for loading transfer data DIR received from the transfer line 4 and for outputting output data DOR at the timing of the reception side operation clock RCLK.

In this asynchronous interface, the delay of the transfer data DOT is more significant than that of the transfer reference signal STBT, as described above, and a time difference between these delays is significant enough to always effectively sample the transfer data DIR at a clock edge by which an assertion of the transfer reference signal STBR is sampled first. Accordingly, as shown in FIG. 2B, the reception side can load the transfer data DIR sampled at an edge of the operation clock RCLK in the reception side by which an assertion of the transfer reference signal STBR is detected. The transfer data DIR can be used as output data DOR. The above mentioned Japanese Patent Kokai No. 2002-215568 teaches that, in spite of the asynchronous circuit, this circuit has a capability to make a simulation in a similar manner as a synchronous circuit and to verify the validity of the circuit.

Figure 3A:
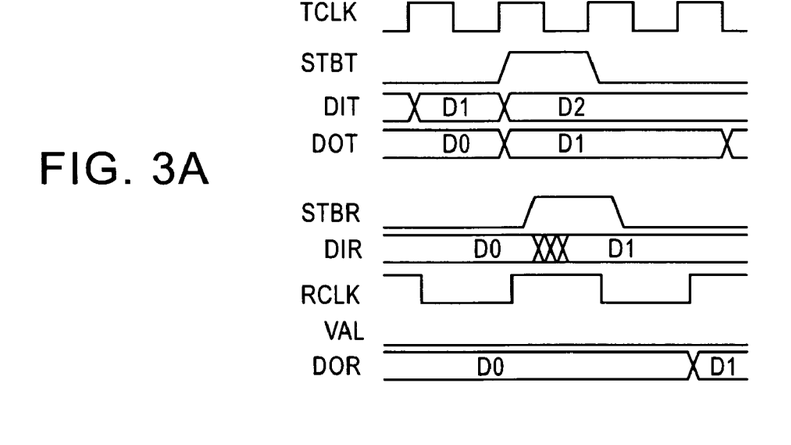
FIG. 3A-3C are charts illustrating problems of a conventional asynchronous interface.
Figure 3B:
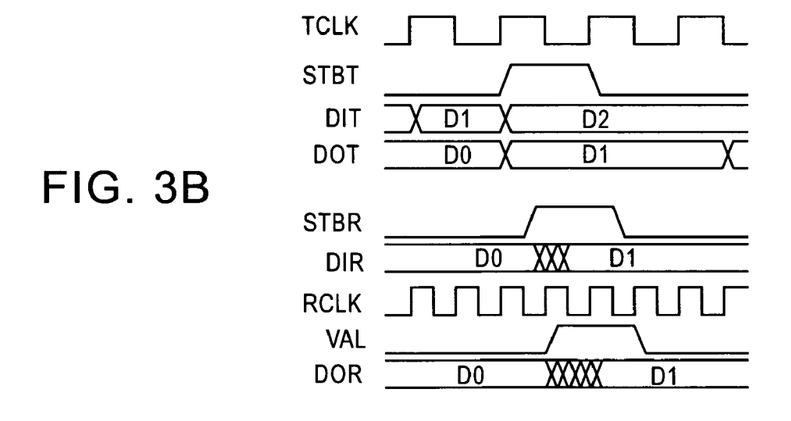
Figure 3C:
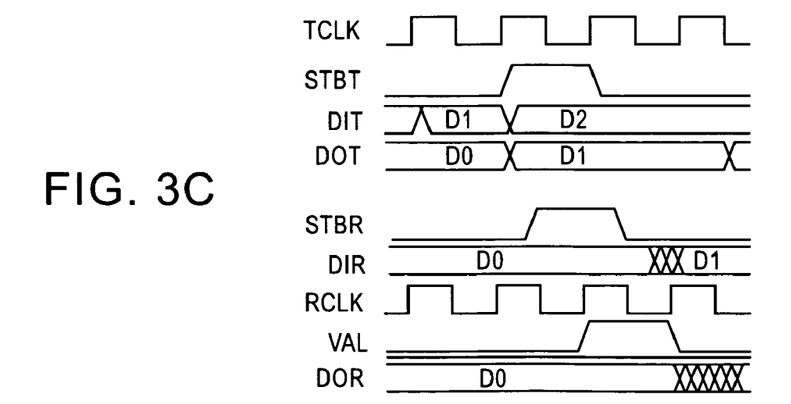

The asynchronous interface in FIG. 2A, however, has the following problems. FIGS. 3A-3C of the accompanying drawings are charts depicting the problems of the conventional asynchronous interface.

(1) As shown in FIG. 3A, if a cycle of the reception side operation clock RCLK is longer than that of the transmission side operation clock TCLK, the transfer reference signal STBR cannot be loaded by means of the reception side operation clock RCLK when these clocks, i.e. TCLK and RCLK, are in a certain phase relationship. This may make it impossible to output the output data DOR to an FF in the next stage, even though the transfer data DIR shows a transition.

(2) As shown in FIG. 3B, if a cycle of the reception side operation clock RCLK is shorter than that of the transmission side operation clock TCLK, the valid signal VAL may be output before the transfer data DIR is verified, and thus uncertain output data DOR may be output to an FF in the next stage.

(3) As shown in FIG. 3C, if the transfer data DIR is slower than the transfer reference signal STBR, the output data DOR before update may be output or the output data DOR may become uncertain data, even though the valid signal VAL is active.

As described above, since the cycle of the transmission side operation clock TCLK is different from that of the reception side operation clock RCLK, the phase relationship of these clocks, i.e. TCLK and RCLK, is not fixed. Therefore it cannot be logically guaranteed that the transfer data DOT and the transfer reference signal STBT, which are driven by the transmission side operation clock TCLK, can be reliably loaded at the timing of the reception side operation clock RCLK.

SUMMARY OF THE INVENTION

One object of the present invention is to provide a data transfer circuit that has a capability to reliably transfer the data between the circuits which use clock signals having different cycles with respect to each other.

According to one aspect of the present invention, there is provided a data transfer circuit. The data transfer circuit includes a transmission section having a first register for loading and outputting transmission data according to a timing of a transmission clock signal when a writing enable signal is supplied, and a strobe generation unit for starting a transmission of a strobe signal and a count of the transmission clock signals when the writing enable signal is supplied, and for stopping the transmission of the strobe signal when a counted value of the transmission clock signals reaches a set value. The data transfer circuit further includes a reception section including a second register for loading and holding the transmission data according to a timing of a reception clock signal, an edge detection unit for receiving the strobe signal and for outputting a valid signal having a pulse width corresponding to one cycle of the reception clock signal when the stop of the strobe signal is detected, and a third register for loading the transmission data held in the second register and outputting it as reception data according to a timing of the reception clock signal when the valid signal is supplied. The data transfer circuit further includes a transfer line to which the transmission data is output from the first register, and from which the transmission data is loaded to the second register. The transmission data is transferred in the data transfer circuit by means of the clock signals having different frequencies between the transmission section and the reception section.

The data transmission side is provided with a strobe generation unit for starting a transmission of strobe signals to the reception side at the same time of the outputting of transmission data to the transfer line, and for stopping the transmission of the strobe signals when a counted value of the transmission clock signals reaches a set value. On the other hand, the data reception side is provided with an edge detection unit for outputting a valid signal having a pulse width corresponding to one cycle of the reception clock signal when the stop of the strobe signal is detected, and a register for loading the data and outputting the reception data according to the timing of the reception clock signal when the valid signal is supplied. Accordingly, the data can be reliably transferred without being influenced by the dispersion of the delay time of the transfer data even though the frequencies of the clocks are different between the transmission side and the reception side.

The transmission side outputs the transmission data to the transfer line according to the transmission clock signal, starts to count the transmission clock signals, and instructs the receptive side to receive data when the count value reaches the set value provided by the control device. The reception side generates a valid signal which has a pulse width corresponding to one cycle of the reception clock signal according to the instruction from the transmission side, and loads the data on the transfer line according to the reception clock signal as reception data while this valid signal is provided.

The above and other objects and new characteristics of the present invention will be more precisely clarified by reading the following description of the preferred embodiments with reference to the accompanying drawings. The drawings are for description, and do not limit the scope of the present invention.

DETAILED DESCRIPTION OF THE INVENTION

Figure 1:
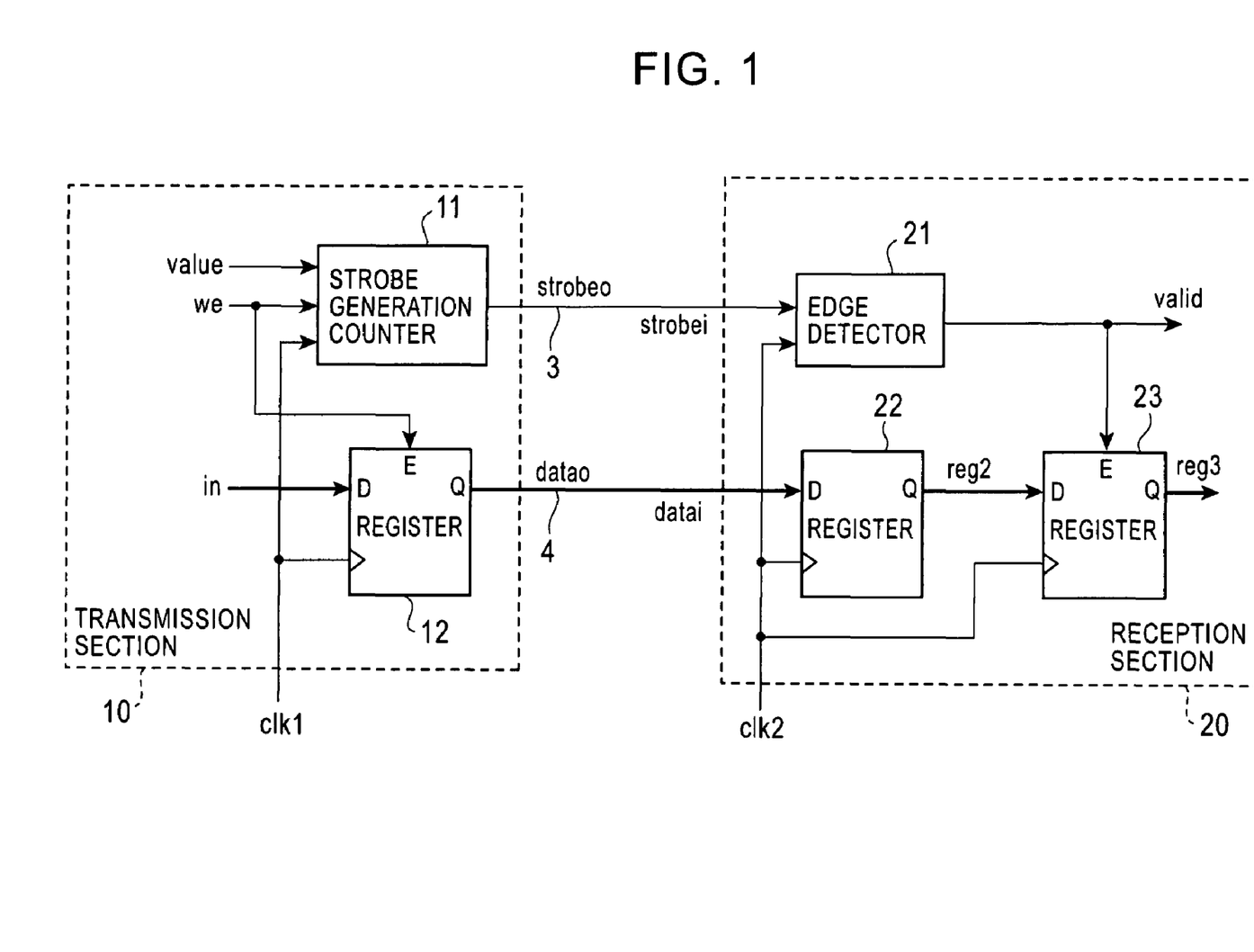
FIG. 1 is a block diagram showing a data transfer circuit of the first embodiment of the present invention.

FIG. 1 is a block diagram showing the data transfer circuit of the first embodiment of the present invention. This data transfer circuit includes a transmission section 10, a reception section 20, a transfer line 3 connecting these sections for strobe signals, and a transfer line 4 for transferring a plurality of data in parallel.

The transmission section 10 further includes a strobe generation counter 11 and a register 12. The strobe generation counter 11, to which a set value value, a writing control signal we and a transmission clock signal clk1 are supplied, outputs the strobe signal strobeo. When the writing control signal we becomes active, the strobe generation counter 11 activates and outputs the strobe signal strobeo at the next rise timing of the transmission clock signal clk1, and starts to count the transmission clock signal clk1. When the counted value reaches the set value value, the strobe generation counter 11 inactivates the strobe signal strobeo. The strobe signal strobeo is supplied to the transfer line 3 connected to the transmission section 10.

The register 12 loads and holds transmission data in at a rise timing of the transmission clock signal clk1 when the writing control signal we is active, and outputs it to the transfer line 4 as transfer data datao.

The reception section 20, on the other hand, has an edge detector 21 and registers 22 and 23.

The edge detector 21, to which a strobe signal strobei and a reception clock signal clk2 are supplied, outputs a valid signal valid. The edge detector 21 outputs the valid signal valid at the next rise timing of the reception clock signal clk2 after the strobe signal strobei, received from the transfer line 3, becomes inactive. The valid signal valid has a pulse width corresponding to one cycle of the reception clock signal clk2.

At a rise timing of the reception clock signal clk2, the register 22 loads and holds transfer data datai received from the transfer line 4, and outputs it as data reg2. The register 23 loads and holds the data reg2 from the register 22 at a rise timing of the reception clock signal clk2 while the valid signal valid is supplied, and outputs it as reception data reg3.

The set value value for the strobe generation counter 11 is predetermined such that the edge detector 21 can detect the edge of the strobe signal strobei according to the cycles of the transmission clock signal clk1 and the reception clock signal clk2. The delay time of the transfer data datai in the transfer line 4 is set to be longer than the delay time of the strobe signal strobei in the transfer line 3.

Figure 4A:
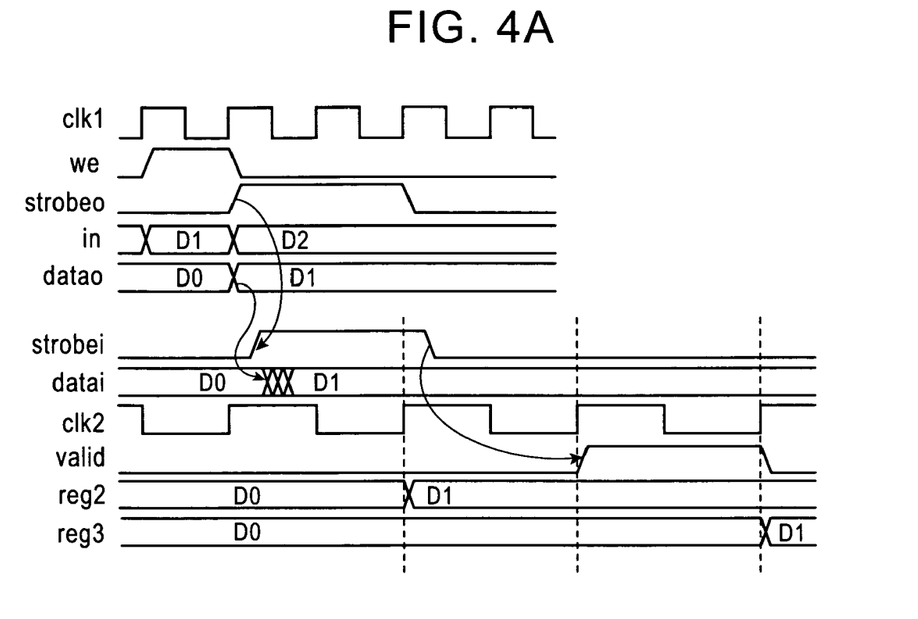
FIGS. 4A and 4B are signal waveform charts illustrating operations of the data transfer circuit shown in FIG. 1.
Figure 4B:
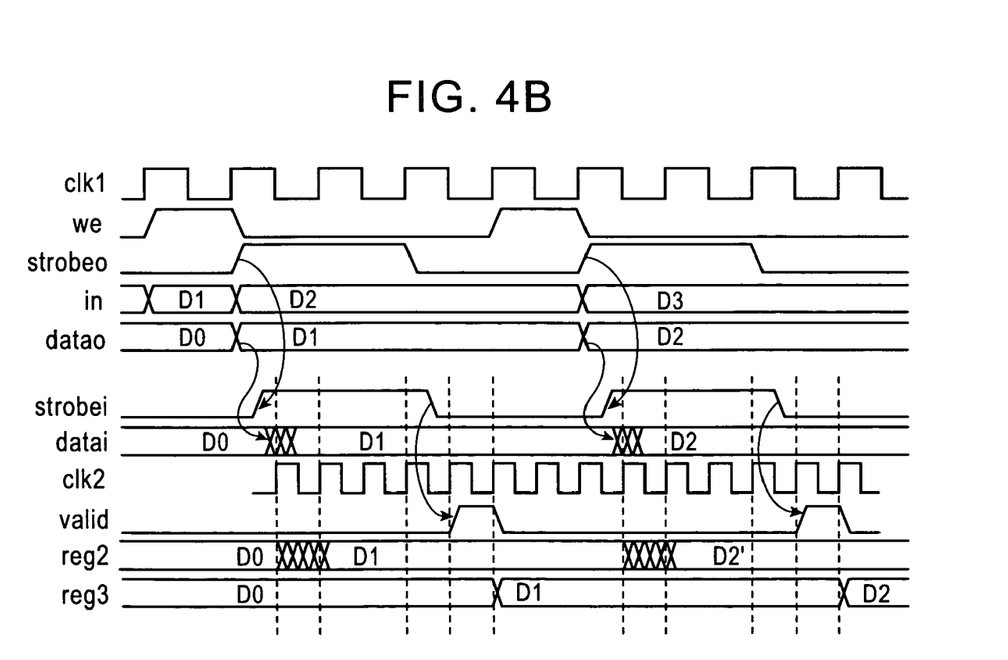

FIGS. 4A and 4B are signal waveform charts illustrating operations of the data transfer circuit shown in FIG. 1. FIG. 4A shows an operation case in which a cycle of the transmission clock signal clk1 is shorter than that of the reception clock signal clk2.

First, in the transmission section 10, the writing control signal we becomes active ('H'), and the transmission data in transits to 'D1'. Thereafter, the transmission data in is loaded on the register 12 and the strobe signal strobeo becomes active and is output to the transfer line 3 at a rise timing of the transmission clock signal clk1. The transmission data in ('D1') loaded on the register 12 is output to the transfer line 4 as the transfer data datao.

The strobe signal strobeo and the transfer data datao are supplied to the reception section 20 via the transfer lines 3 and 4 as the strobe signal strobei and the transfer data datai, respectively.

In the reception section 20, the strobe signal strobei transferred via the transfer line 3 is supplied to the edge detector 21. At this point of time, the strobe signal strobei is 'H', so that the output signal of the edge detector 21 becomes 'L', and the valid signal valid is not output.

The transfer data datai ('D1'), transferred via the transfer line 4, is loaded on the register 22 at a rise timing of the reception clock signal clk2. The data reg2, loaded onto the register 22, is supplied to an input terminal D of the register 23.

When a clock count of the transmission clock signal clk1 reaches the set value value, the strobe signal strobeo output from the enable generation counter 11 of the transmission section 10 becomes inactive ('L'), and is stopped.

In the edge detector 21 of the reception section 20, when the stop of the strobe signal strobei is detected, the valid signal valid becomes 'H' and is output at a rise timing of the reception clock signal clk2 after the stop of the strobe signal. Upon outputting the valid signal, an operation of the register 23 is enabled, so that the data reg2 supplied from the register 22 is loaded on the register 23 at the next rise timing of the reception clock signal clk2. At the same time, the valid signal valid returns to 'L'. Accordingly, the reception data reg3 output from the register 23 becomes 'D1'.

FIG. 4B shows an operation case in which a cycle of the transmission clock signal clk1 is longer than that of the reception clock signal clk2. An operation of this case is similar to that of the above mentioned FIG. 4A. Specifically, after the verified transfer data datai is loaded on the register 22 in the reception section 20 side, the valid signal valid is output, the data reg2 loaded on the register 22 is loaded on the register 23 according to the timing of the reception clock signal clk2, and is output as the reception data reg3.

In this way, in the data transfer circuit according to the first embodiment, the pulse width of the strobe signal strobeo output from the transmission section 10 is increased, and the reception section 20 loads the received transfer data datai at the timing of the reception clock signal clk2 after the received strobe signal strobei is stopped. Accordingly, even though the cycles of the clock signals are different between the transmission side and the reception side, the data can be reliably transferred therebetween.

The set value value for the strobe generation counter 11 of the transmission section 10 may be controlled by a control unit, such as a microcomputer, rather than the fixed value. By using the control unit, an optimum efficiency depending on the frequency of the clock signal can be assured. For example, it is assumed that the transmission clock signal clk1 is a bus clock, and the reception clock signal clk2 is 12 MHz for USB. In this case, the set value value must be 5 if the transmission clock signal clk1 is 60 MHz in normal operation, but the set value value can be set to 1 if the transmission clock signal clk1 is 6 MHz in low power consumption mode. Accordingly, an unnecessary delay of the data transfer does not occur.

Figure 5:
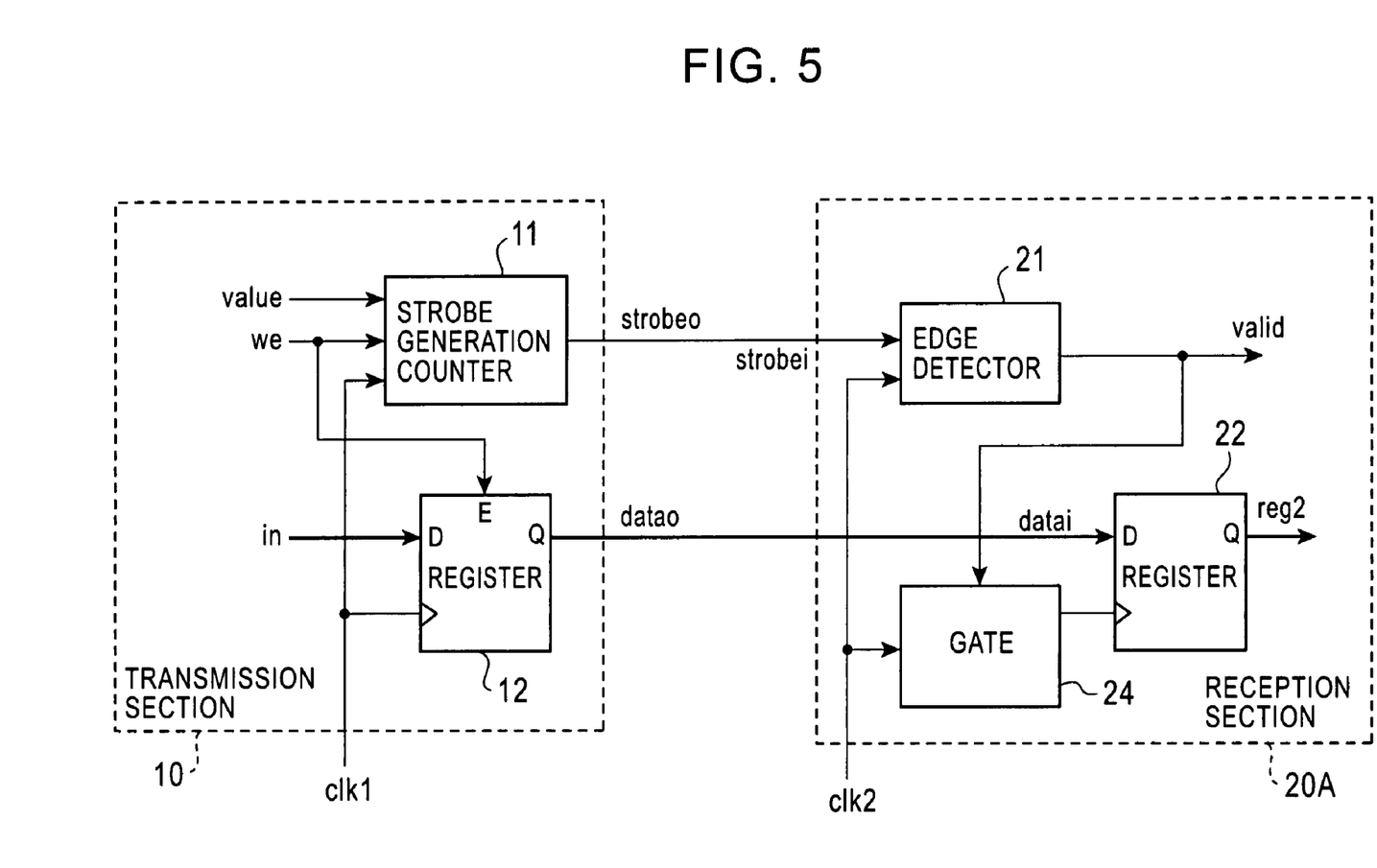
FIG. 5 is a block diagram showing the data transfer circuit of the second embodiment of the present invention.

FIG. 5 is a block diagram showing the data transfer circuit of the second embodiment of the present invention. This data transfer circuit is formed by replacing the reception section 20 in FIG. 1 with a reception section 20A having a different configuration. In FIG. 5, the same reference numerals are assigned for the similar elements to the elements in FIG. 1.

The reception section 20A includes an edge detector 21 which is similar to that in FIG. 1. The valid signal valid output from the edge detector 21 is supplied to a gate 24. The gate 24 has, for example, an AND gate. When the valid signal valid is output ('H'), the gate 24 supplies the reception clock signal clk2 for a clock terminal of a register 22 as a reception timing signal. The transfer data datai received from the transfer line 4 is supplied to an input terminal D of the register 22, and reception data reg2 is output from an output terminal of the register 22.

Figure 6:
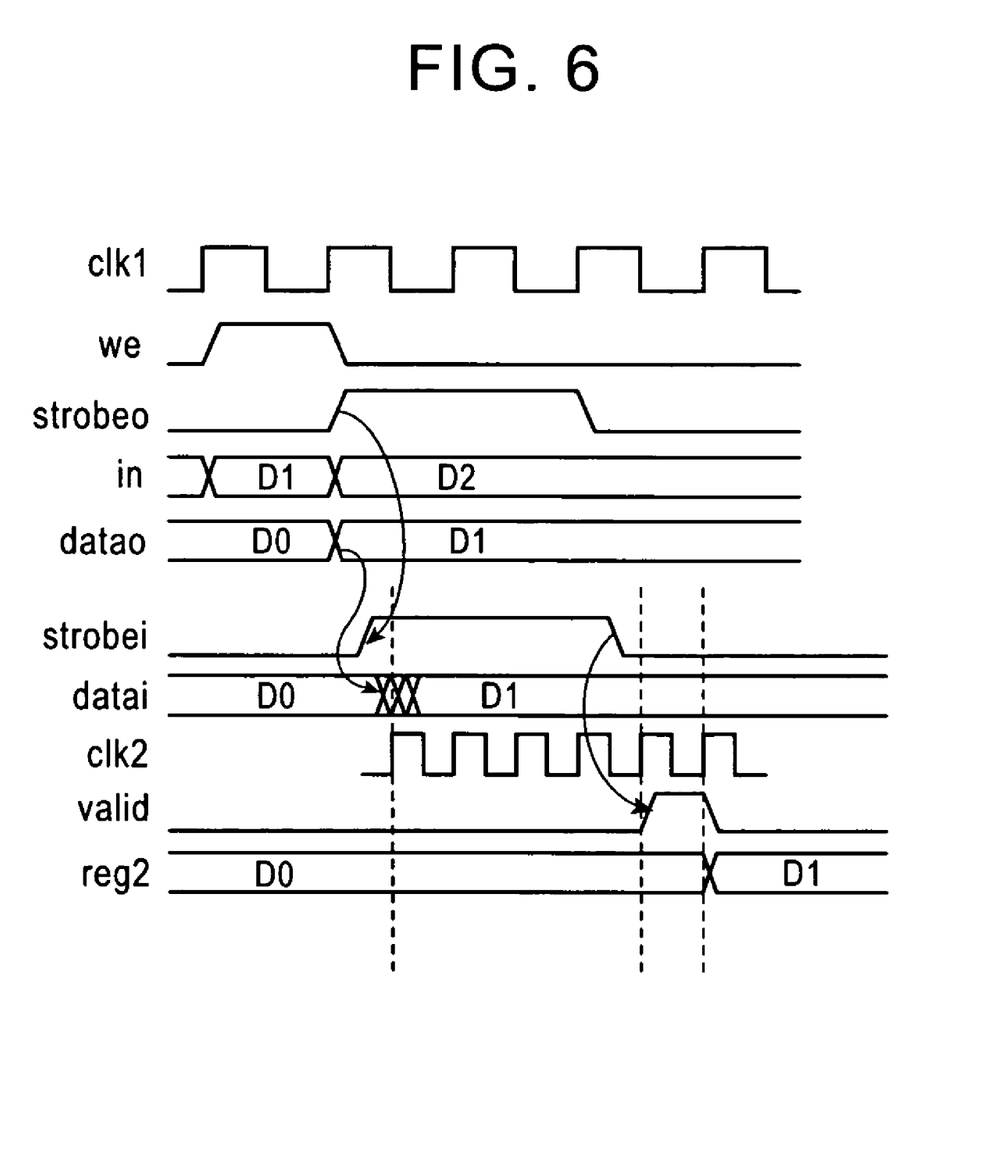
FIG. 6 is a signal waveform chart illustrating an operation of the data transfer circuit shown in FIG. 5.

FIG. 6 is a signal waveform chart illustrating an operation of the data transfer circuit shown in FIG. 5.

As shown in the operation of the data transfer circuit, the transfer data datai is loaded on the register 22 and the reception data reg2 is updated only during the period when the valid signal valid is 'H', and the rest of the operation is similar to the operation in FIG. 1.

As described above, the data transfer circuit of the second embodiment has the gate 24, which limits the loading of the transfer data datai on the register 22 during the period when the valid signal valid is 'H'. Because of this, the reception data reg2 does not cause an unnecessary data transition, so that in addition to the advantages of the first embodiment, this data transfer circuit does not receive unstable data and can suppress an increase in power consumption due to an unnecessary clock operation.

Figure 7:
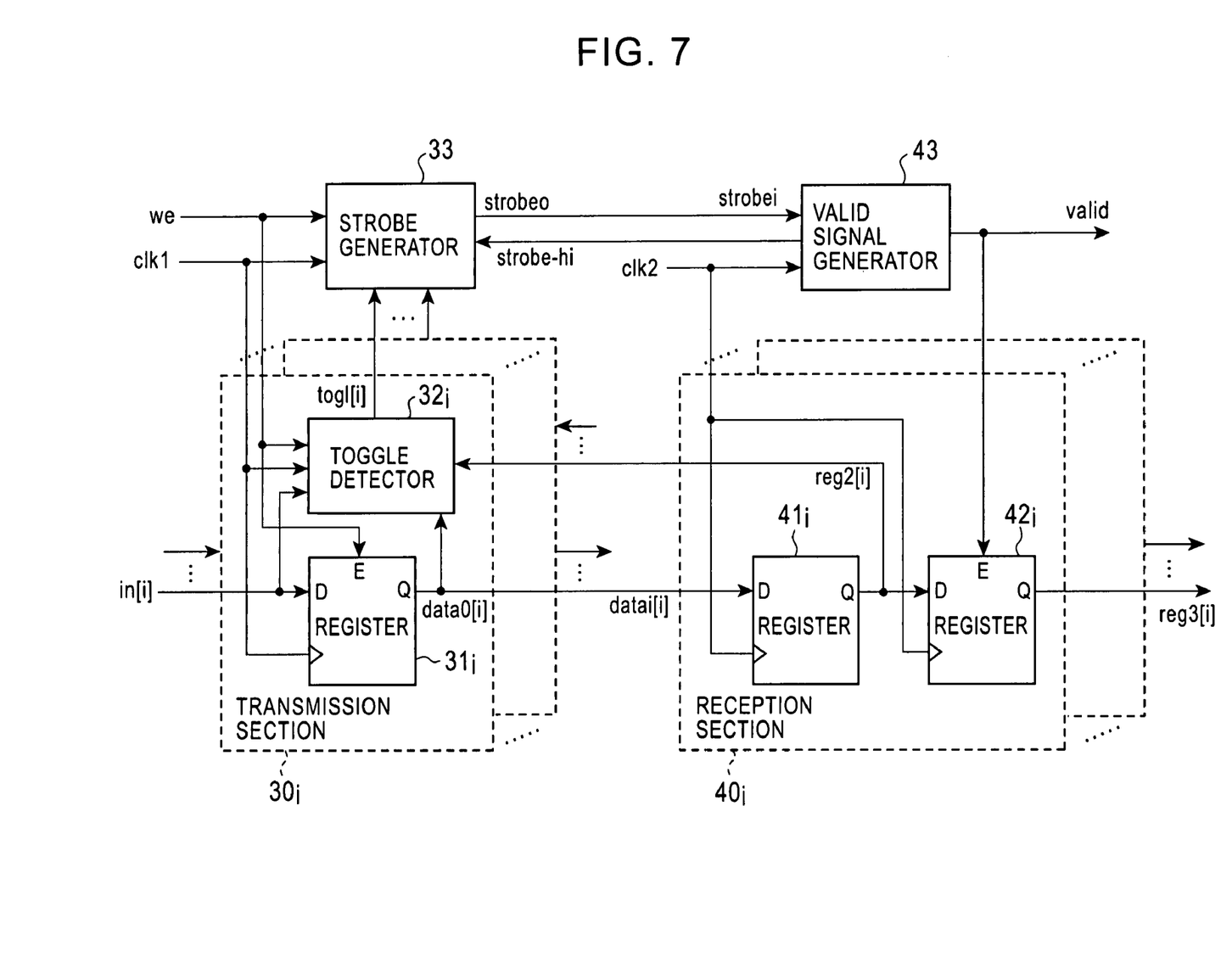
FIG. 7 is a block diagram showing the data transfer circuit of the third embodiment of the present invention.

FIG. 7 is a block diagram showing the data transfer circuit of the third embodiment of the present invention.

This data transfer circuit transfers n data bits in parallel. In the data transfer circuit, the transmission side includes transmission sections $30_i$ (i=1–n) respectively corresponding to these data bits, and load instruction means (e.g. a strobe generator 33) which is common to all data bits. On the other hand, the reception side includes reception sections $40_i$ respectively corresponding to these data bits, and valid signal generation means (e.g. a valid signal generator 43) which is common to all data bits.

Each transmission section $30_i$ includes parallel transmission means (e.g. a register $31_i$) for loading, holding and outputting transmission data in[i] at a timing of a transmission clock signal clk1 when a writing control signal we is active, and transmission confirmation means (e.g. a toggle detector $32_i$) for comparing a transfer data datao[i] output from the register $31_i$ with a reply signal reg2[i] transferred from the reception side for each bit.

The toggle detector $32_i$ includes a device such as a flip-flop. The toggle detector $32_i$ has a function to store the current transfer data datao[i], and to set the toggle signal tog1[i] to 'H' and output it when transfer data datao[i], which is output from the register $31_i$ according to the next timing of the transmission clock signal clk1, changes from the current transfer data datao[i]. In addition, the toggle detector $32_i$ has a function to stop the output of the toggle signal tog1[i], i.e. to set the toggle signal to 'L', when a reply signal reg2[i], which is transferred from the corresponding reception section $40_i$, matches with the transfer data datao[i].

The strobe generator 33 monitors the toggle signals tog1[i] output from the toggle detectors $32_i$ of transmission section $30_i$, and generates and outputs a strobe signal strobeo at the next timing of the transmission clock signal clk1 when at least one bit of the toggle signal tog1[i] is output. When a reply signal strobe-hi is supplied from a valid signal generator 43 in the reception side, the strobe generator 33 stops the output of the strobe signal strobeo.

Each reception section $40_i$ includes parallel reception means (e.g. a register $41_i$) for loading, holding and outputting the transfer data datai[i] transferred from the register $31_i$ via a transfer line at a timing of the reception clock signal clk2, and output means (e.g. a register $42_i$) for loading, holding and outputting data reg2[i] output from the register $41_i$ at a timing of the reception clock signal clk2 when the valid signal valid is output from the valid signal generator 43. The data reg2[i] output from the register $41_i$ is supplied to the register $42_i$, and is also transferred to the toggle detector $32_i$ as a reply signal reg2[i]. Reception data reg3[i] is output from the register $42_i$.

The valid signal generator 43 outputs the reply signal strobe-hi when the strobe signal strobei, which is transferred from the strobe generation unit 33 via the transfer line, becomes 'H'. The valid signal generator 43 stops the output of the reply signal strobe-hi when the strobe signal strobei becomes 'L', and outputs the valid signal valid having a pulse width corresponding to one cycle of the reception clock signal clk2 at the next rise timing of the reception clock clk2.

Figure 8:
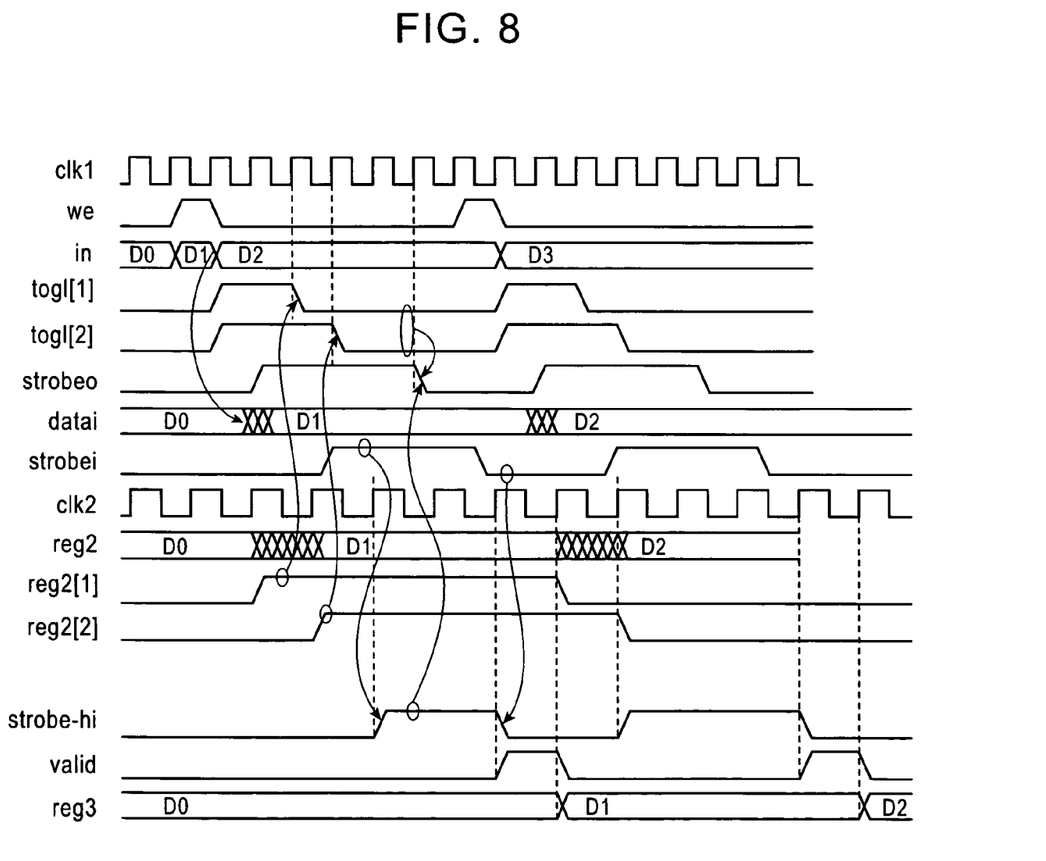
FIG. 8 is a signal waveform chart illustrating an operation of the data transfer circuit shown in FIG. 7.

FIG. 8 is a signal waveform chart illustrating an operation of the data transfer circuit shown in FIG. 7. FIG. 8 shows a case when the delay times of 2 bits of the transmission data are different with respect to each other.

First, when the writing control signal we becomes 'H' and the transmission clock signal clk1 rises in the transmission section 30, the transmission data in[1] and in[2] are loaded on the registers $31_1$ and $31_2$, and the transfer data datao[1] and datao[2] are updated and transferred to the reception side. At the same time, in the toggle detectors $32_1$ and $32_2$, the change of the transfer data datao is detected, and the toggle signals tog1[1] and tog1[2] are output.

At the next rise of the transmission clock signal clk1, the strobe signal strobeo is generated from the strobe generator 33, and is transferred to the reception side.

At the reception side, on the other hand, the signals on the transfer lines are loaded onto the registers $41_1$ and $41_2$ at rise timings of the reception clock signal clk2, respectively. In this case, the delay times in the transmission lines are different between the transfer data datai[1] and datai[2], so that the update timings are also different between the data reg2[1] and reg2[2], which are output from the registers $41_1$ and $41_2$. The reception data reg2[1] and reg2[2] are supplied to the registers $42_1$ and $42_2$, respectively, and are transferred to the toggle detectors $32_1$ and $32_2$ as the reply signals reg2[1] and reg2[2].

When the strobe signal strobei, which is sent via the transfer line, is supplied to the valid signal generator 43, the reply signal strobe-hi is output from this valid signal generator 43 to the strobe generation unit 33 at a rise timing of the reception clock signal clk2.

When the response signal reg2[2], of which the delay time is long, arrives at the toggle detector $32_2$, all the toggle signals tog1[1] and tog1[2] supplied to the strobe detector 33 are stopped. Thus, the strobe signal strobeo from the strobe generator 33 is also stopped. When the strobe signal strobei supplied to the valid signal generator unit 43 stops, the reply signal strobe-hi output from the valid signal generator unit 43 is stopped, and the valid signal valid having a pulse width corresponding to one cycle of the reception clock signal clk2 is output.

The valid signal valid is supplied to the enable terminals E of the registers $42_1$ and $42_2$, so that the data reg2[1] and reg2[2], which are output from the registers $41_1$ and $41_2$, are held by these registers $42_1$ and $42_2$ at the next timing of the reception clock signal clk2, and are output as the reception data reg3.

In this way, the data transfer circuit of the third embodiment includes the toggle detectors $32_i$ for confirming the match between the transmission data in[i] and the reply signal reg2[i] fed back from the reception side for each bit, the strobe generator 33 for outputting the strobe signal strobeo until the confirmation of the transfer of all the bits, and the valid signal generator 43 for outputting the valid signal valid to the registers $42_i$ when the received strobe signal strobei is stopped. This handshake mechanism has an advantage to be able to reliably transfer data without being influenced by the difference of the frequencies of the clock signals and the dispersion of the delay times of the transfer data. Particularly even though the delay time on the transfer line is increased due to small defects (e.g. abnormality of through hole resistance value) in the manufacturing process, the data can be reliably transferred, so that a drop in yield can be suppressed.

The configuration and the method for the handshake is not limited to those described in the third embodiment. For example, the transmission side has a configuration such that it transfers the strobe signal to the reception side and then instructs the reception side to load the reception data when the transmission side detects the completion of a reception by confirming the reply data from the reception side for all the bits of the transfer data.

This application is based on Japanese Patent Application No. 2004-109062 filed on Apr. 1, 2004 and the entire disclosure thereof is incorporated herein by reference.

What is claimed is:

1. A data transfer circuit comprising:
   a transmission section including a first register for loading and outputting transmission data according to a timing of a transmission clock signal when a writing enable signal is supplied, and a strobe generation unit for starting a transmission of a strobe signal and a count of the transmission clock signals when the writing enable signal is supplied, and for stopping the transmission of the strobe signal when a counted value of the transmission clock signals reaches a set value;
   a reception section including a second register for loading and holding the transmission data according to a timing of a reception clock signal, an edge detection unit for receiving the strobe signal and for outputting a valid signal having a pulse width corresponding to one cycle of the reception clock signal when the stop of the strobe signal is detected, and a third register for loading the transmission data held in the second register and outputting it as reception data according to a timing of the reception clock signal when the valid signal is supplied; and
   a first transfer line to which the transmission data is output from the first register, and from which the transmission data is loaded to the second register,
   wherein the transmission data is transferred in the data transfer circuit by means of the clock signals having different frequencies between the transmission section and the reception section.

2. The data transfer circuit according to claim 1, wherein the set value can be arbitrarily set.

3. The data transfer circuit according to claim 1, wherein the data transfer circuit further includes a second transfer line connected between the strobe generation unit and the edge detection unit for transferring the strobe signal.

4. The data transfer circuit according to claim 3, wherein a delay time of the transmission data in the first transfer line is set to be longer than a delay time of the strobe signal in the second transfer line.

5. The data transfer circuit according to claim 2, wherein the set value is controlled by a control unit.

6. A data transfer circuit comprising:
   a transmission section including a first register for loading and outputting transmission data according to a timing of a transmission clock signal when a writing enable signal is supplied, and a strobe generation unit for starting a transmission of a strobe signal and a count of the transmission clock signals when the writing enable signal is supplied, and for stopping the transmission of the strobe signal when a counted value of the transmission clock signals reaches a set value;
   a reception section including an edge detection unit for receiving the strobe signal and for outputting a valid signal having a pulse width corresponding to one cycle of a reception clock signal when the stop of the strobe signal is detected, a gate for outputting the reception clock signals as a reception timing signal when the valid signal is supplied, and a second register for loading the transmission data and outputting it as reception data according to the reception timing signal; and
   a first transfer line to which the transmission data is output from the first register, and from which the transmission data is loaded to the second register,
   wherein the transmission data is transferred in the data transfer circuit by means of the clock signals having different frequencies between the transmission section and the reception section.

7. The data transfer circuit according to claim 6, wherein the set value can be arbitrarily set.

8. The data transfer circuit according to claim 6, wherein the data transfer circuit further includes a second transfer line connected between the strobe generation unit and the edge detection unit for transferring the strobe signal.

9. The data transfer circuit according to claim 8, wherein a delay time of the transmission data in the first transfer line is set to be longer than a delay time of the strobe signal in the second transfer line.

10. The data transfer circuit according to claim 7, wherein the set value is controlled by a control unit.

11. The data transfer circuit according to claim 6, wherein the gate is formed by an AND gate.

12. A data transfer circuit comprising:
   a transmission section including parallel transmission means for loading a plurality of bits of transmission data and transmitting them in parallel according to a timing of a transmission clock signal when a writing enable signal is supplied, transmission confirmation means for comparing signals transmitted in parallel from the parallel transmission means with a plurality of bits of first reply signals for each bit, and for outputting a transmission signal when the compared signals are all matched, and loading instruction means for starting the transmission of a load instruction signal when the transmission signal is supplied, and for stopping the transmission of the load instruction signal when a second reply signal is received;

a reception section including parallel reception means for loading and holding data in parallel according to a timing of a reception clock signal and for transferring the held data to the transmission section as the first reply signal, valid signal generation means for outputting a valid signal having a pulse width corresponding to one cycle of the reception clock signal and for transmitting the second reply signal when the loading instruction signal is received, and output means for loading the data in parallel held in the parallel reception means and outputting them as reception data according to a timing of the reception clock signal when the valid signal is supplied; and a first transfer line to which the transmission data is output from the parallel transmission means, and from which the data is loaded to the parallel reception means, wherein the transmission data is transferred in the data transfer circuit by means of the clock signals having different frequencies between the transmission section and the reception section.

13. The data transfer circuit according to claim 12, wherein the data transfer circuit further includes a second transfer line connected between the loading instruction means and the valid signal generation means for transferring the load instruction signal, a third transfer line connected between the loading instruction means and the valid signal generation means for transferring the second reply signal, and a fourth transfer line connected between the parallel reception means and the transmission confirmation means for transferring the first reply signals.

14. The data transfer circuit according to claim 12, wherein the transmission confirmation means is formed by a flip flop.

15. A data transfer circuit comprising:

a transmission section including a parallel transmission unit for loading a plurality of bits of transmission data and transmitting them in parallel according to a timing of a transmission clock signal when a writing enable signal is supplied, a transmission confirmation unit for comparing signals transmitted in parallel from the parallel transmission unit with a plurality of bits of first reply signals for each bit, and for outputting a transmission signal when the compared signals are all matched, and a loading instruction unit for starting the transmission of a load instruction signal when the transmission signal is supplied, and for stopping the transmission of the load instruction signal when a second reply signal is received;

a reception section including a parallel reception unit for loading and holding data in parallel according to a timing of a reception clock signal and for transferring the held data to the transmission section as the first reply signal, a valid signal generation unit for outputting a valid signal having a pulse width corresponding to one cycle of the reception clock signal and for transmitting the second reply signal when the loading instruction signal is received, and an output unit for loading the data in parallel held in the parallel reception unit and outputting them as reception data according to a timing of the reception clock signal when the valid signal is supplied; and a first transfer line to which the transmission data is output from the parallel transmission unit, and from which the data is loaded to the parallel reception unit, wherein the transmission data is transferred in the data transfer circuit by means of the clock signals having different frequencies between the transmission section and the reception section.

16. The data transfer circuit according to claim 15, wherein the data transfer circuit further includes a second transfer line connected between the loading instruction unit and the valid signal generation unit for transferring the load instruction signal, a third transfer line connected between the loading instruction unit and the valid signal generation unit for transferring the second reply signal, and a fourth transfer line connected between the parallel reception unit and the transmission confirmation unit for transferring the first reply signals.

17. The data transfer circuit according to claim 15, wherein the transmission confirmation unit is formed by a flip flop.

* * * * *